(12) United States Patent
Malacinski et al.

(10) Patent No.: US 6,348,935 B1
(45) Date of Patent: Feb. 19, 2002

(54) PROGRAMMABLE TREE VIEWER GRAPHICAL USER INTERFACE WITH INTEGRATED CONTROL PANEL

(75) Inventors: Andrei S. Malacinski, Cary, NC (US); Michael D. Rahn, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/200,618

(22) Filed: Nov. 30, 1998

(51) Int. Cl.[7] ................................................ G06F 3/14
(52) U.S. Cl. ........................ 345/853; 345/855; 345/840
(58) Field of Search ................................ 345/853, 855, 345/840, 854, 835, 779, 781, 784, 804, 825, 841, 866

(56) References Cited

U.S. PATENT DOCUMENTS

| | | | | |
|---|---|---|---|---|
| 5,675,753 A | * | 10/1997 | Hansen et al. | 345/781 X |
| 5,689,669 A | * | 11/1997 | Lynch et al. | 345/854 X |
| 5,706,456 A | * | 1/1998 | Dupper et al. | 345/841 X |
| 6,020,888 A | * | 2/2000 | Ho | 345/835 |
| 6,078,327 A | * | 6/2000 | Liman et al. | 345/854 |
| 6,151,024 A | * | 11/2000 | Alimpich et al. | 345/854 |

OTHER PUBLICATIONS

Blaha, C., Tree List, a Dialog Object for Viewing Assigning Values to, and Creating Hierarchical Data Structures, *IBM Technical Disclosure Bulletin*, V. 37, n3, pp. 399–402, Mar. 1994.

Austen, R. F., Graphical User Interface for the Distributed System Namespace, *IBM Technical Disclosure Bulletin*, V. 35, n2, pp. 335–336, Jul., 1992.

Hakiel, S.R. and Murphy, A.S., Selected Object Filter on Pop–Up Menu, *IBM Technical Disclosuer Bulletin*, V. 39, n9, pp. 157–162, Sep., 1996.

Screen Capture from Microsoft Windows Explorer® (undated).

Screen Capture from America On–Line's Instant Messenger, Version 1.75 Copyrights 1996–1998 (undated).

Screen Captures from Lotus Notes (undated).

* cited by examiner

Primary Examiner—Raymond J. Bayerl
(74) Attorney, Agent, or Firm—Myers Bigel Sibley & Sajovec

(57) ABSTRACT

Composite graphical user interfaces and associated methods and computer program products are provided for representing and manipulating a set of hierarchical data on a computer display device. These composite graphical user interfaces include a display window which is disposed on a computer display device, a tree view display which is disposed within the display window, and a tree view control panel disposed within the display window adjacent the tree view display which includes a plurality of user selectable indicia that select a corresponding one of a plurality of functions which modify the tree view display. The plurality of user selectable indicia are selectable from a predefined set of user selectable indicia, thereby allowing an application developer or user to customize the control functions made available on the tree view control panel. In these composite graphical user interfaces, the tree view display depicts the set of hierarchical data in a tree representation having a root level and at least one lower level, and each level of the tree representation includes at least one branch containing a portion of the set of hierarchical data. The tree view display and the tree view control panel are disposed within the display window so as to appear to the user as a single integrated graphical user interface.

21 Claims, 9 Drawing Sheets

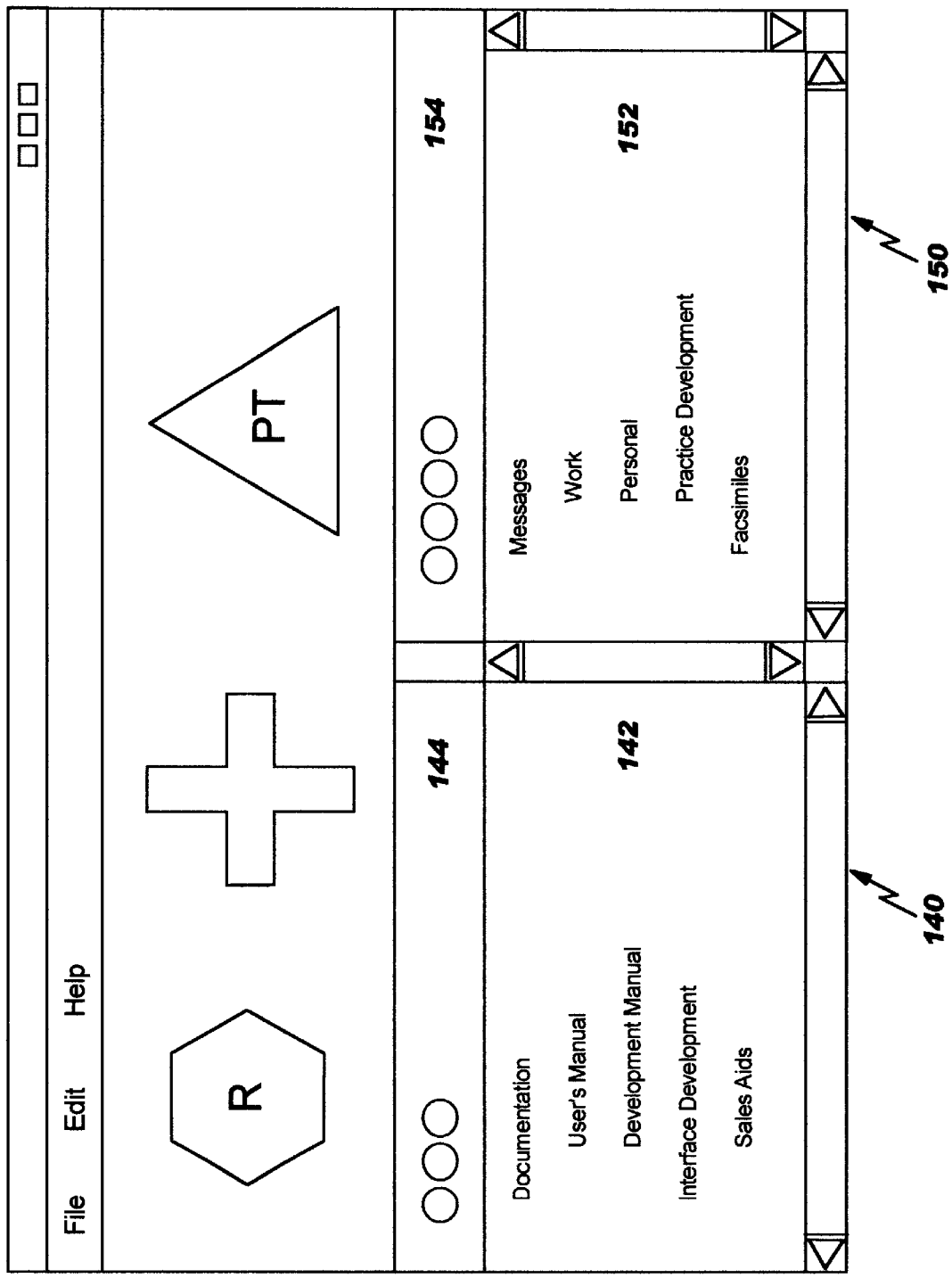

PROGRAMMABLE TREE VIEWER GRAPHICAL USER INTERFACE WITH INTEGRATED CONTROL PANEL

FIELD OF THE INVENTION

The present invention relates generally to user interfaces for computer systems. More particularly, the present invention relates to "tree view" user interfaces for representing and manipulating hierarchical data in computer applications and systems.

BACKGROUND OF THE INVENTION

Over the last two decades, significant increases in personal computer processing capability and equally significant decreases in the cost of such computers has led to the proliferation of personal computers in all aspects of society. Thus, today personal computers are heavily utilized in schools, homes and in business. One factor fueling this proliferation of computers throughout numerous aspects of life has been the introduction and expanded use of graphical user interfaces, which have greatly simplified and made more intuitive both computer operating systems and applications. This simplification has allowed less sophisticated computer users to readily use computers for many applications.

Today, the vast majority of personal computer operating systems and application programs are accessed by users via a graphical user interface. Examples of such operating systems are IBM® OS/2®, Apple® System 7®, and Microsoft® Windows®, and example applications include Microsoft Windows Explorer®, Lotus Notes® and Word Perfect®. These operating systems and applications all provide a "window like" workspace for providing users access to applications and information.

A wide variety of operating systems and computer application programs incorporate, display and/or perform operations on data or information which is hierarchical in nature. For example, most computer operating systems provide users access to a hierarchy of directories and sub-directories where documents, programs, e-mail messages and other information are stored. Similarly, organizer applications allow a user to establish task listings, which once again are often hierarchical in nature. With the advent and expanded use of graphical user interfaces, such hierarchical information or data is often displayed to the user in a tree representation. These tree representations visually indicate the level in the hierarchy where each item of data resides, and may allow a user to "expand" or "collapse" the tree at various points (i.e., displaying or hiding information in the lower levels) to facilitate a users viewing of the hierarchical data. Both custom programs, as well as tree viewer objects, are known in the prior art for providing a "tree view" graphical user interface to the user. For example, FIG. 1 is a screen capture of a prior art application (Microsoft Corporation's Windows Explorer) that includes a first display area containing hierarchical data displayed in a tree representation and a second display area adjacent the first display area containing data associated with the hierarchical data displayed in the first display area. America On-Line's Instant Messenger Version 1.75 is another example of an existing application which includes hierarchical data in a tree representation.

While the use of tree viewer objects and custom tree viewer programs has expanded in recent years, so has the complexity of many of the hierarchical data sets that are provided to the user in tree representation. With this increasing complexity, it has become more important that computer users are provided control mechanisms for manipulating the hierarchical data set and for customizing how the hierarchical data appears on their computer screen. Moreover, as computer memory and processing capabilities have expanded, users are now opening up more and more application at the same time, resulting in desktop displays that typically have numerous windows open simultaneously in what may be a confusing, layered display of icons, windows and the like. This increasingly complex display environment has similarly made it important that the control mechanisms available to a user are clearly linked to the icons, windows or other desktop display items with which they are associated. Despite these needs, prior tree representations have often provided only limited capabilities for performing manipulating hierarchical data or customizing how it is displayed on their computer display device, and the ease of accessing such control capabilities, and their methods of implementation, have been less than ideal. Accordingly, there is a need for improvements in graphical user interfaces for representing and manipulating hierarchical data.

SUMMARY OF THE INVENTION

In view of the above limitations associated with existing tree view graphical user interfaces, it is an object of the present invention to provide improved graphical user interfaces for representing and manipulating hierarchical data.

It is another further object of the present invention to provide such improved graphical user interfaces in generic systems or computer program products which can be readily and inexpensively modified to customize the graphical user interface for a specific application or operating system.

It is still a further object of the present invention to provide expanded sets of control functions associated with tree viewer objects. Other objects, features and advantages of the present invention will become apparent upon reading the following detailed description and appended claims and upon reference to the accompanying drawings.

The above-mentioned objects of the present invention are provided by new composite graphical user interface objects which group together a tree viewer object and control functions for manipulating the format and contents of the tree viewer object in a single object. This composite object provides a graphical user interface with a tree view display and a tree view control panel which are implemented within a single computer window within a desktop display. This new user interface object simplifies manipulation of hierarchical data displayed in its associated tree view display, and permits users or application developers to readily choose from a library of potential manipulation functions which are provided within the tree view controller and which may be exclusively directed to control of the tree viewer object. In this manner, a new user interface object for displaying and manipulating hierarchical data in a tree representation is provided, which is more intuitive, easier to use and more functional than traditional tree viewer user interfaces, and which may be readily incorporated into a wide variety of computer applications as an off-the-shelf composite object.

In one embodiment of the present invention, composite graphical user interfaces are provided for representing and manipulating a set of hierarchical data on a computer display device. These composite graphical user interfaces include a display window which is disposed on a computer display device, a tree view display which is disposed within the display window, and a tree view control panel disposed within the display window adjacent the tree view display which includes a plurality of user selectable indicia that select a corresponding one of a plurality of functions which modify the tree view display. The plurality of user selectable indicia are selectable from a predefined set of user selectable indicia, thereby allowing an application developer or user to customize the control functions made available on the tree view control panel. In these composite graphical user interfaces, the tree view display depicts the set of hierarchical data in a tree representation having a root level and at least one lower level, and each level of the tree representation includes at least one branch containing a portion of the set of hierarchical data. Moreover, the tree view display and the tree view control panel are disposed within the display window so as to appear to the user as a single integrated graphical user interface.

In another embodiment of the present invention, selection means operably associated with the tree view display are provided for selecting at least one branch of the tree representation. In this embodiment, the composite graphical user interfaces may include only functions that are exclusively associated with the tree view display. The tree view control panel may comprise a toolbar and the user selectable indicia may comprise a plurality of function buttons. One of the plurality of functions may sub-set the tree representation at a branch below the root level. Other functions may be provided which modify the hierarchical data displayed in the tree representation, which modify how the hierarchical data in the tree representation is displayed, and which move the selection means from a currently selected branch to a different branch in the tree representation.

In still another embodiment of the present invention, the graphical user interface may be implemented by a programmable user interface object. Methods are also provided for displaying and manipulating a set of hierarchical data, as are computer program products. These graphical user interfaces, programmable user interface objects, and computer program products provide intuitive, convenient to use, flexible interface means which can be implemented as an off-the-shelf product in a wide variety of different computer applications.

BRIEF DESCRIPTION OF THE DRAWINGS

FIG. 7 is a diagram illustrating an application program which includes two user interfaces according to the teachings of the present invention.

DETAILED DESCRIPTION OF THE INVENTION

Figure 1:
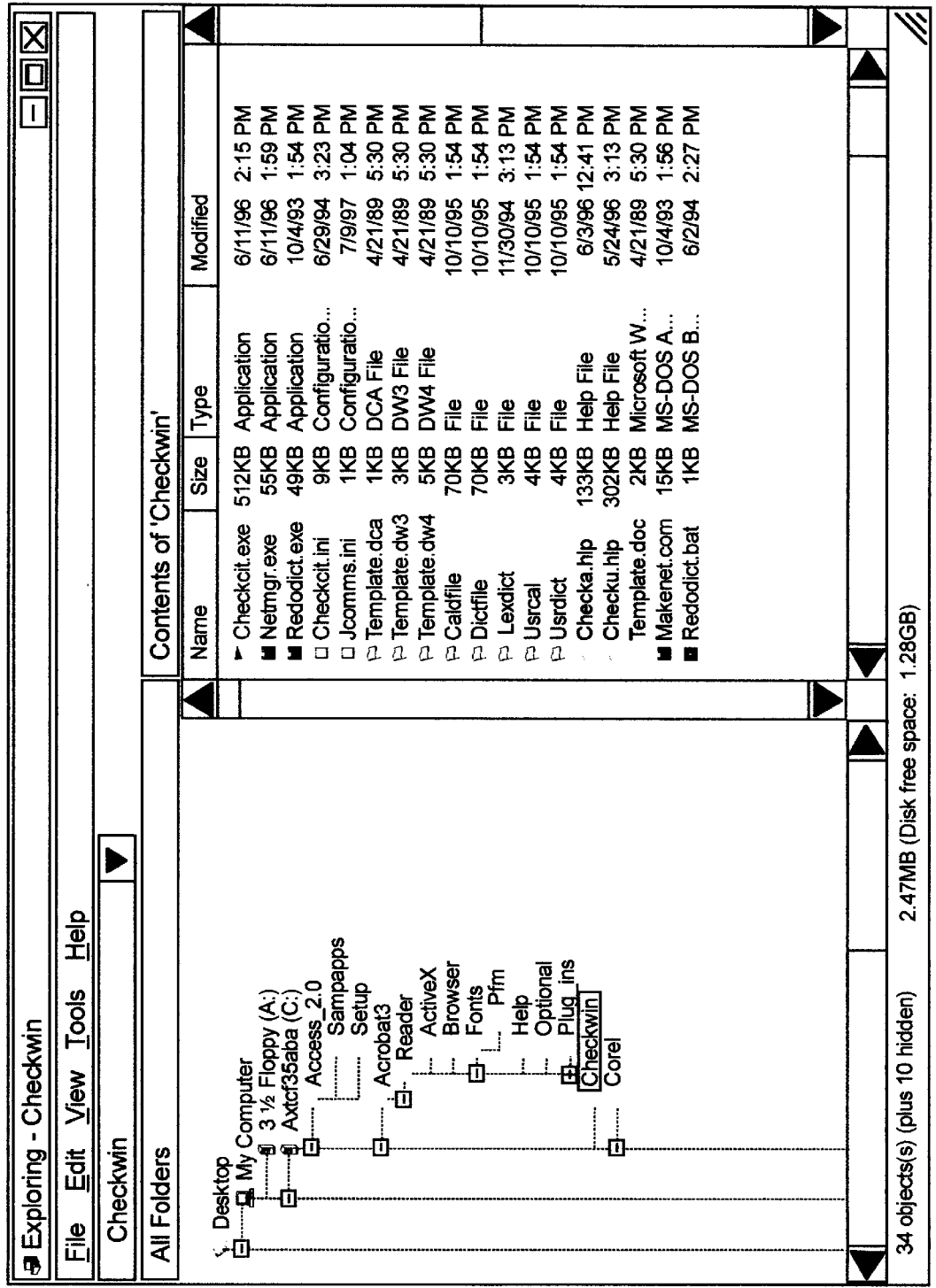
FIG. 1 is a screen capture of a prior art user interface which includes data in a tree representation.

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, a device, a data processing system or a program product. Accordingly, the present invention may take the form of an entirely hardware embodiment, an entirely software embodiment or an embodiment which combines software and hardware aspects. Furthermore, the present invention may take the form of a computer program product on a computer readable storage medium having computer readable program code means embodied in the medium. Any suitable computer readable medium may be utilized including for example, hard disks, CD-ROMs, optical storage devices, or magnetic storage devices.

As will also be understood by those of skill in the art, the tree view graphical user interfaces of the present invention may be implemented as user interface objects. Object oriented techniques are well known to those of skill in the art, and as such, these techniques will not be described in detail herein. However, various preferred embodiments of the graphical user interfaces of the present invention are described herein in terms of programming objects, and it will be understood that these references to objects should be interpreted in light of the understanding in the art regarding object oriented techniques.

The present invention provides graphical user interfaces and related objects, methods and computer program products, for displaying hierarchical data in tree representation. These user interfaces and user interface objects implement within a single window in a desktop display both a tree view display and an associated tree view control panel which is adjacent the tree view display and which provides the user access to functions that modify the manner in which the tree view display represents the hierarchical data. By implementing the tree view display and the tree view control panel adjacent each other within a single window, users of the graphical user interfaces of the present invention are provided with an intuitive, easy to use tree view display window that reinforces the relationship between the tree view display and the tree view control panel.

Moreover, the graphical user interface objects of the present invention are composite objects in that they include in a single off-the-shelf package both a tree viewer object and means for controlling the tree viewer object which interface to application programs, operating systems and platforms through a single interface mechanism. Furthermore, this composite object is programmable in that the tree view control means may also be customized for a specific application by selecting from a plurality of predefined control functions. Thus, the graphical user interface objects of the present invention further provide computer application developers with tree representation means which do not require custom coded control mechanisms yet still provide flexibility in the range of tree view control functions which are made available to users of the application.

Figure 2:
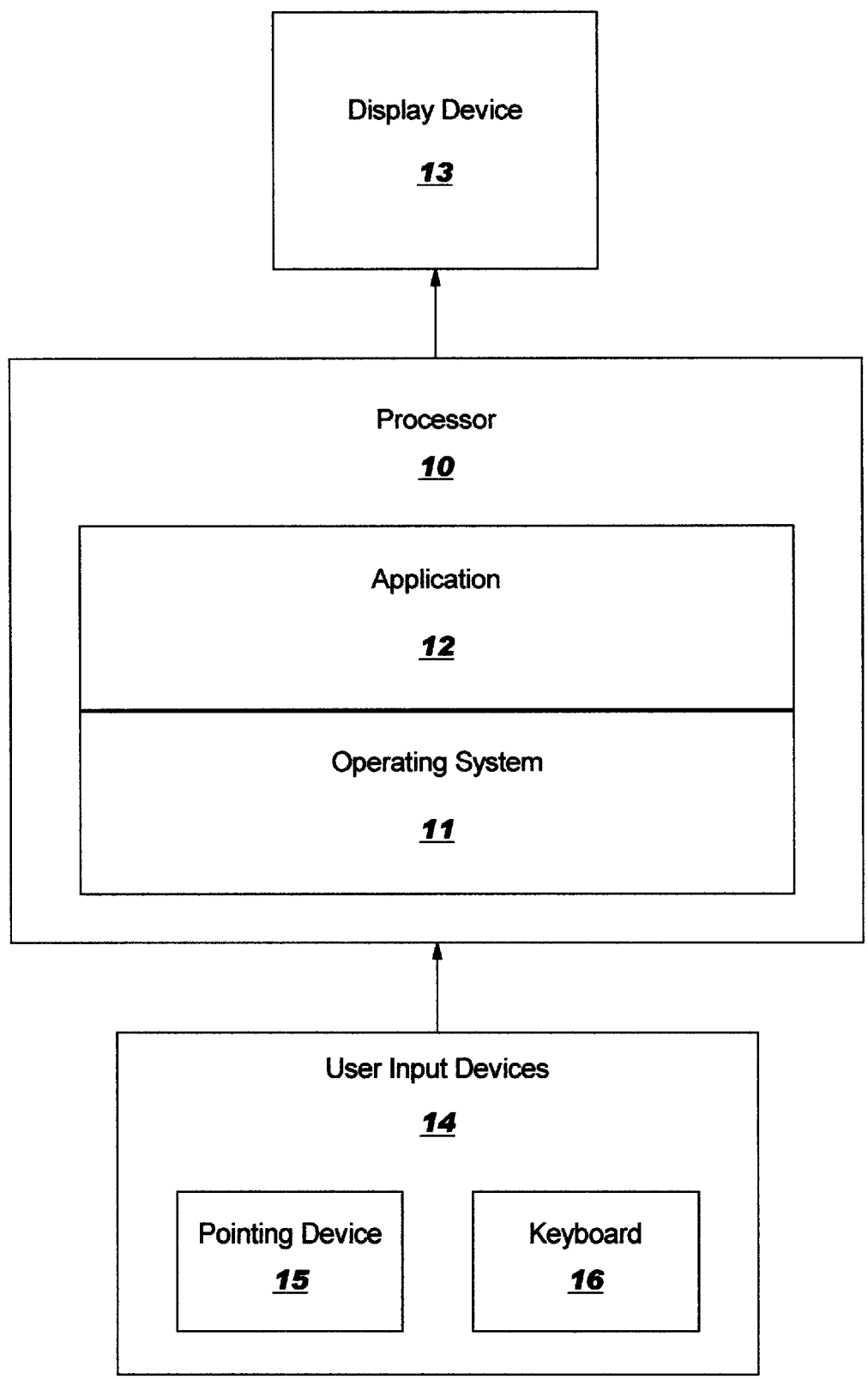
FIG. 2 is a logical diagram of a system utilizing the present invention.

FIG. 2 illustrates a data processing system on which user interfaces according to the present invention may be utilized. As seen in FIG. 2, a data processor 10 may have an operating system 11 resident in the processor. An application 12 may be running on the operating system. The processor 10 displays information on a display device 13. The display device 13 has a plurality of picture elements (collectively referred to as a screen) which may define the appearance of a user interface environment displayed on the display device 13. The contents of the display device 13 and, therefore, the appearance of the user interface environment, may be controlled or altered by the application 12 or the operating system 11 either individually or in combination.

For obtaining input from a user, the operating system 11, the application 12 or both may utilize user-input devices 14. User input devices 14 may include a pointing device 15 and a keyboard 16 or other peripheral input devices known to those of skill in the art. User input devices 14 may be used to designate areas of the screen or locations on the screen such as the border of a workspace or the corner of the borders of the workspace. Furthermore, once designated, the user interface may display a separate icon to indicate that selection of that location of the screen may translate the feature of the workspace or the workspace itself to a different location. As is well known to those of skill in the art, multiple windows may be displayed on the screen of a computer display device simultaneously in what is often referred to as a "desktop" display. Windows within a desktop are defined by a border which surrounds the window and may also include a title bar and in some cases a series of menu choices which may manage the appearance and contents of the window. In combination with a pointing device, windows may typically be independently moved and resized by "dragging" a border to a new location, although as used herein, the term "window" encompasses bordered workspaces regardless of whether or not they may be independently moved and/or resized.

Figure 3:
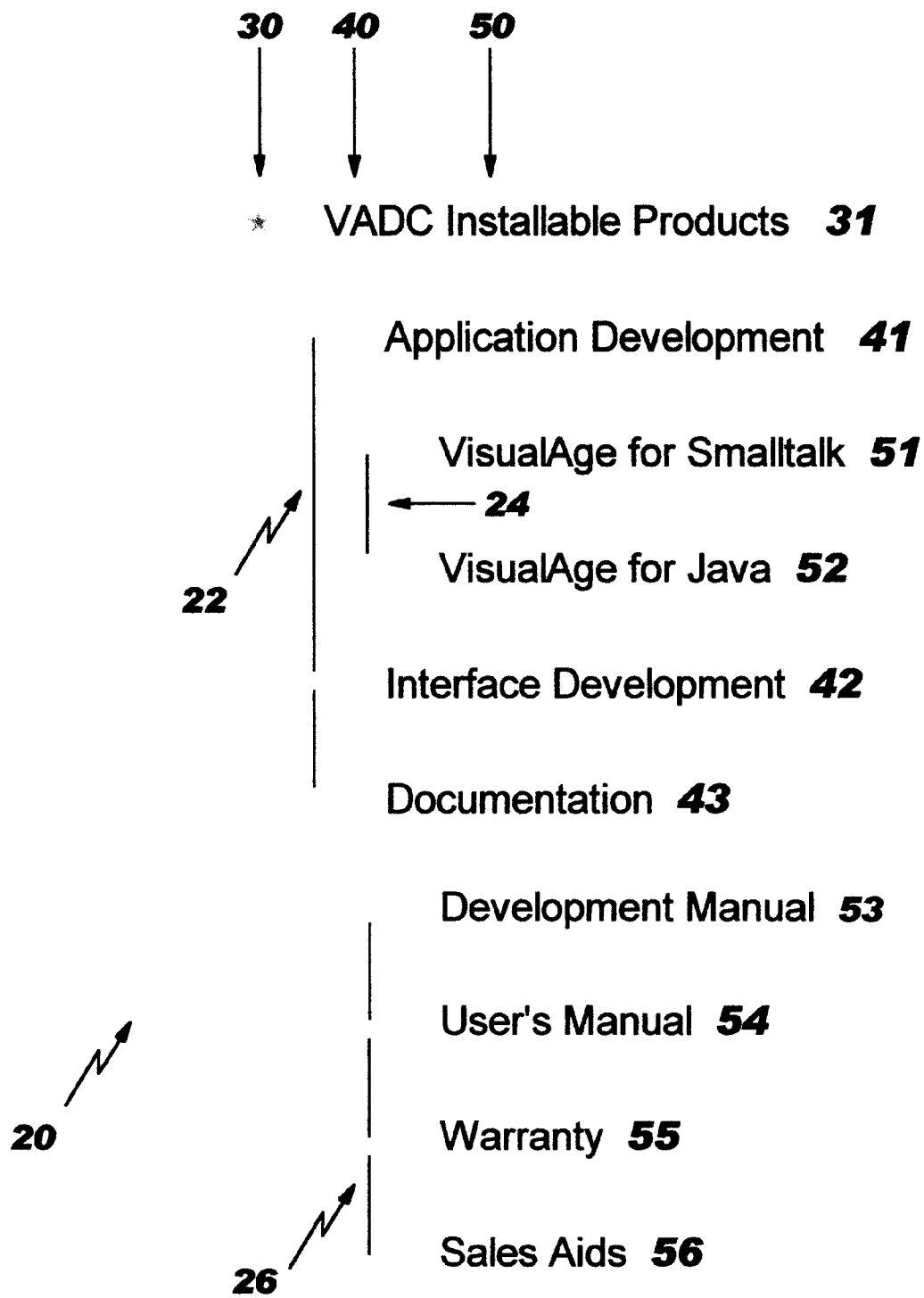
FIG. 3 illustrates hierarchical data presented in a tree representation.

In a variety of different applications it may be desirable to represent or display data in what is known as a tree representation. FIG. 3 illustrates a representative example of data displayed in such a tree representation 20. As shown in FIG. 3, the tree representation 20 extends horizontally from the left of the page, with the data arranged in a series of levels 30, 40, 50, which are physically offset from each other along the horizontal axis. In the tree representation 20 of FIG. 3, level 30 is the lowest or "root" level, and level 50 is the highest level. As illustrated in FIG. 3, each level of the tree representation 20 includes one or more branches. Herein, the term "branch" refers to the one or more data entries which are displayed at a particular level in tree representation 20. Thus, for example, level 40 of tree representation 20 includes branches 41, 42, 43, and level 50 includes branches 51, 52, 53, 54, 55, 56. Tree representation 20 may further include various other graphical indicia which aid in interpreting the data, such as lines 22, 24, 26 which aid in delineating the various levels of the tree.

As will be appreciated by those of skill in the art, tree representations are particularly useful in displaying hierarchical data. The levels of the tree representation visually depict the location of each piece of data in a way that quickly and intuitively conveys to a user both the location of the data within the hierarchy and the relationship of that data to other data in the hierarchy. Moreover, the hierarchical structure may allow users to more quickly and efficiently peruse the data, such as by reviewing the entries at the higher levels to locate particular branches which are most likely to contain the information of interest.

As will also be understood by those of skill in the art, the hierarchical data presented in a tree representation may, in some instances, comprise all relevant data, wherein in other instances, the data displayed in the tree representation serves as an index or summary of underlying information which a user may wish to access. For instance, family genealogy information is often displayed using a tree representation, and the information so displayed in many cases may comprise the full listing of hierarchical data. Computer directory structures also comprise data that is often displayed in a tree representation; however, in this instance, the user typically uses the tree representation as a means of locating and accessing underlying computer files. Thus it will be understood that the graphical user interface objects of the present invention are applicable to either type of hierarchical data set or a combination of the two.

The use of tree representations to display hierarchical data is particularly useful in a number of computer applications. Custom coded tree viewer applications, as well as tree viewer "objects" for providing such tree representations, are known in the art. A tree viewer object refers to a system or, more typically, a computer program product which is designed to interface with other software programs in a manner similar to a program subroutine, and which is capable of displaying data or information in a tree representation. Custom-coded tree viewer applications refer to software applications which include custom program code that displays data in a tree representation. In both prior art tree viewer objects and custom-coded tree viewer applications, users have, in some instances, been provided at least some capability for manipulating the data in the tree representation or modifying how the data is displayed. For instance, as noted above, FIG. 1 is a screen capture of a user interface provided in the Windows 95 Windows Explorer application which includes a first display field containing a tree representation on the left hand side of the figure that is linked to a second display field on the right hand side of the figure. Both of the aforementioned display fields are enclosed within a single application window, which also includes various pull down menus and a control panel which contains functions relating to each of the first and second display fields or to the application program in general. However, these prior art user interfaces typically provided the tree view control functions through custom coding or external controls, as opposed to via the cohesive composite user interface objects of the present invention. Moreover, these prior art user interfaces, such as the user interface of FIG. 1, failed to provide tree view control function interfaces which were either physically grouped with the tree view or which were exclusively directed to tree view control. Thus, these prior art user interfaces were less intuitive and functional than the composite graphical user interface objects discussed herein.

Figure 4A:
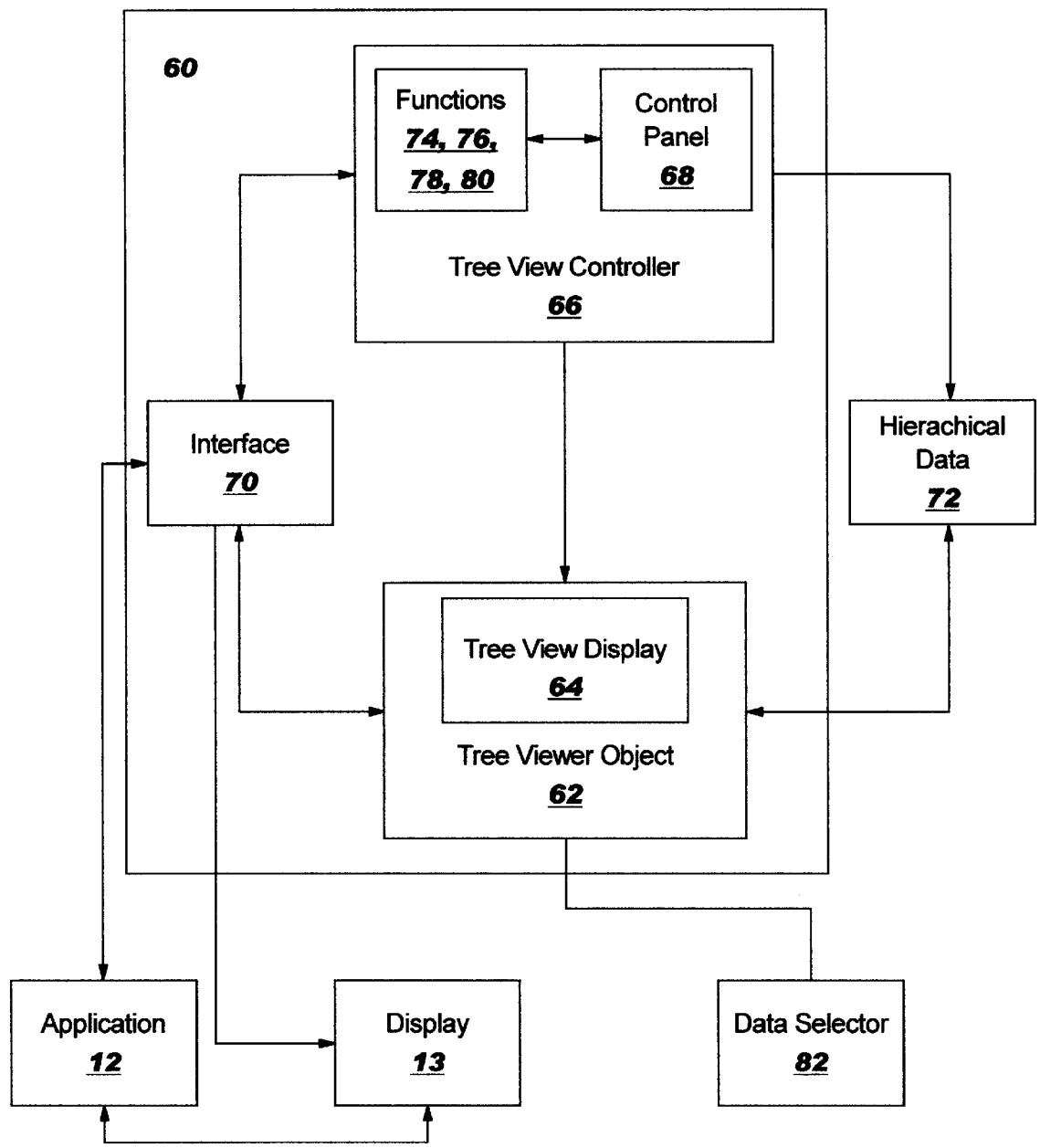
FIG. 4(a) is a block diagram of a graphical user interface object according to preferred embodiment of the present invention.

FIG. 4(a) is a block diagram illustrating an object-oriented implementation of the present invention. As illustrated in FIG. 4(a), a graphical user interface object 60 is provided that comprises a tree viewer object 62, a tree view controller 66, and an interface mechanism 70 which interfaces both tree viewer object 62 and tree view controller 66 with an application 12. User interface object 60 is operably associated with a set of hierarchical data 72, which may or may not comprise part of user interface object 60 and which may or may not comprise a part of application 12. Thus, in FIG. 4(a) hierarchical data 72 is illustrated as being independent of both user interface object 60 and application 12. However, it will be understood that hierarchical data 72 could comprise part of application 12 or be provided to user interface object 60 via application 12, or alternatively, could be imbedded within user interface object 60.

Figure 4B:
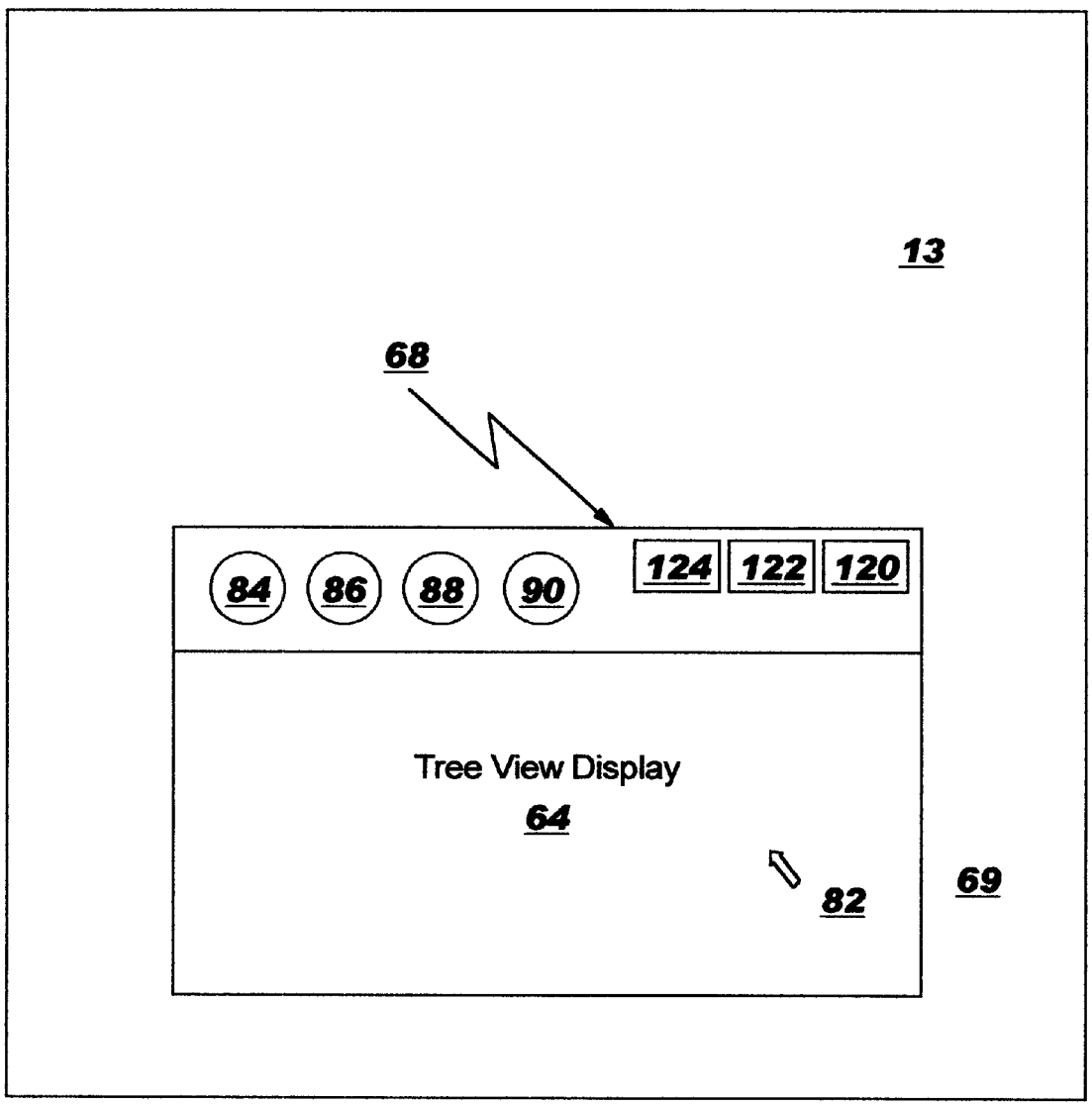
FIG. 4(b) illustrates how the tree view display and the tree view control panel may appear on a user's display device.

As shown in FIG. 4(a), tree viewer object 62 includes a tree view display 64 which is provided to display the hierarchical data 72 to a user in a tree representation via the display device 13 on the user's data processing system. As shown in FIG. 4(*a*), the tree view display 64 may be provided to display device 13 directly via interface 70, or through an application 12 in which user interface object 60 may be embedded. Tree view controller 66 includes a plurality of control functions 74, 76, 78, 80 (see FIG. 4(*b*)) which are operably associated with a control panel 68 which is displayed on display device 13. This control panel 68 comprises a plurality of user selectable indicia 84, 86, 88, 90, each of which correspond to one of the plurality of control functions 74, 76, 78, 80. By selecting one of the user selectable indicia 84, 86, 88, 90 displayed in the control panel 68 on display device 13, the user implements the corresponding function 74, 76, 78, 80 associated with tree view controller 66. This function in turn operates on tree viewer object 62 so as to modify the tree view display 64 in some fashion. For instance, functions may be provided which operate directly on the hierarchical data 72 (i.e., functions for adding, deleting or editing the data), which in turn modify the data which is displayed in tree view display 64. Other functions may be provided which modify how the hierarchical data 72 is displayed in the tree view display 64 (i.e., by expanding or collapsing branches of the tree representation). Still other functions may be provided which move a cursor or other selection means 82 within the tree view display 64, which may, for example, be used as a method for a user to scroll up or down tree view display 64. Functions may also be provided which modify other aspects of the appearance of the tree view display 64. Note that these functions 74, 76, 78, 80 may modify the tree view display either by changing the display itself (e.g., by expanding a branch of the tree or scrolling down the tree), or by changing the hierarchical data which is displayed in the tree in some fashion.

As is also indicated in FIG. 4(*a*), an interface 70 is provided which interfaces both the tree viewer object 62 and the tree view controller 66 with an application 12 and/or a display device 13. A common interface 70 may be used as, pursuant to the teachings of the present invention, composite graphical user interface objects are provided which implement both the tree viewer object and the tree view controller 66 as a single integrated object which may conveniently be integrated into any of a wide variety of application programs 12. As will be understood by those of skill in the art in light of the present disclosure, interface mechanism 70 may define how the hierarchical data 72 is formatted and other aspects of the interface between user interface object 60 and an application 12 such that an application developer may incorporate user interface object into an application. Preferably, interface 70 is implemented using industry standard interface formats so as to allow integration of user interface object 60 into an application 12 with the need for little or no custom programming steps.

FIG. 4(*b*) conceptually depicts how a preferred embodiment of the user interfaces of the present invention appear to a user via a display device 13. As shown in FIG. 4(*b*), a window 69 is provided on the display device 13. As will be understood by those of skill in the art, window 69 may be the only window which appears on display device 13, or it may be one of a plurality of windows which are part of a desktop display. In the embodiment of FIG. 4(*b*), the window 69 is divided into two area—one which includes the tree view display 64 associated with tree viewer object 62 and the other which includes the tree view control panel 68 associated with tree view controller 66. In a preferred embodiment of the present invention, tree view display 64 and tree view control panel 68 are implemented in a visually distinct manner such as by coloring the background of the areas differently (as shown in FIG. 4(*b*)) or by separating the areas by lines or the like. However, these distinctions should not disrupt the appearance of the tree view display 64 and the tree view control panel 68 as a single integrated presentation which are contained within their own window 69, as pursuant to the teachings of the present invention it is realized that a user will find the control panel 68 easier and more intuitive to use when its association with tree view display 64 is made clear by their adjacent position and their containment within a window dedicated to the tree representation.

In FIG. 4(*b*), the tree view control panel 68 is located adjacent to and directly above the tree view display 64. It will be appreciated, however, that tree view control panel 68 may be located anywhere within window 69, although preferably it is located immediately adjacent tree view display 64 along one of the edges of window 69. In a preferred embodiment, one of the plurality of functions 74, 76, 78, 80 associated with tree view controller 66 establishes where the control panel appears within window 69. Such a function, for example, could have four settings which allow the user to place the control panel along any edge of window 69, and could additionally (via a fifth setting) allow the user to hide the control panel 68.

As discussed above and illustrated in FIG. 4(*b*), the tree view control panel 68 comprises a plurality of user selectable indicia 84, 86, 88, 90 which allow a user to access one or more of the functions 74, 76, 78, 80. As will be understood by those of skill in the art, these user selectable indicia may comprise control buttons, pull down menus, graphical images or the like. When one of the user selectable indicia 84, 86, 88, 90 is selected, a corresponding one of the functions 74, 76, 78, 80 is implemented, which is operably associated with tree viewer object 62 and the hierarchical data 72. Once selected, the function, may for example, modify the hierarchical data 72 or instruct tree viewer object 62 to modify the tree view display 64 in some manner, examples of which are set forth below.

As is illustrated in both FIG. 4(*a*) and FIG. 4(*b*), the user interfaces of the present invention may be operably associated with a data selector 82. This data selector 82 is provided to facilitate selecting some or all of the hierarchical data 72 displayed in the tree view display 64 for purposes of modifying or otherwise manipulating that data. As is well known in the art, data selector 82 may modify the appearance of the data which is selected and/or display a separate icon to indicate to the user what data was selected. Thus, for instance, the selected data may be highlighted by a rectangular border and/or the font color of the data may be modified to indicate selection of the data. In a preferred embodiment, data selector 82 comprise a pointing device 15 such as a computer mouse, which is used to select data. However, it will be understood that any of a variety of mechanisms for selecting objects within a computer window and/or on a desktop display may be utilized, such as, for example, commands which are entered via the keyboard 16 or audio commands which are recognized and acted upon by voice recognition software/hardware.

Figure 5:
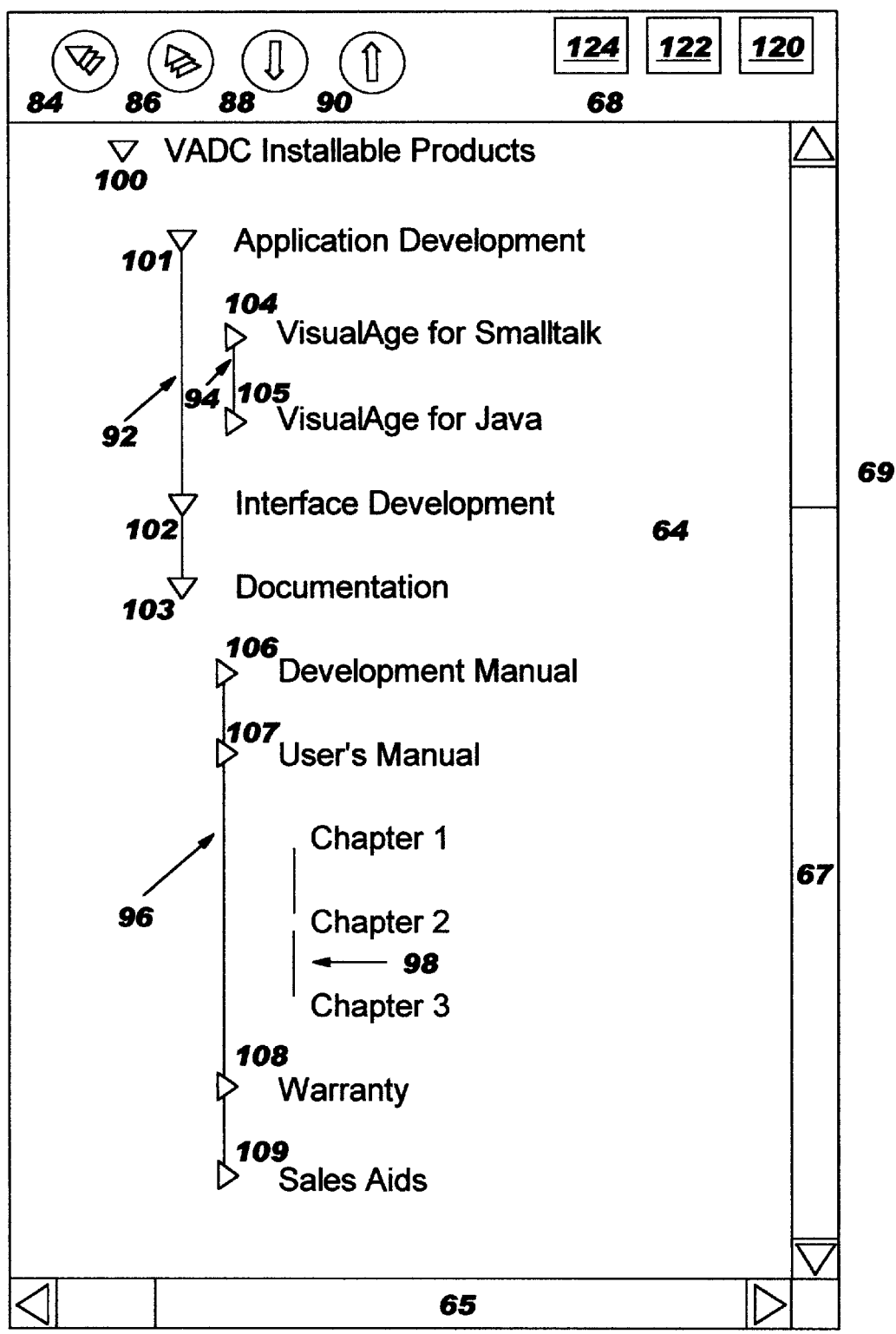
FIG. 5 is a diagram of a graphical user interface object according to the present invention as it might appear on a user's computer screen.

FIG. 5 illustrates how the user interface associated with a representative user interface object 60 according to the present invention would appear on a user's display device 13. As shown in FIG. 5, the tree viewer control panel 68 may conveniently be implemented as a shaded toolbar containing a plurality of buttons 84, 86, 88, 90 which, in this embodiment, is located at the top of window 69 adjacent and above tree view display 64. The tree view display 64 encompasses the remainder of window 69. As illustrated in FIG. 5, the tree view display 64 comprises hierarchical data 72 arranged in a tree representation 20, along with associated symbols 92, 94, 96, 98, and graphical images 100, 101, 102, 103, 104, 105, 106, 107, 108, 109 which facilitate a user's viewing of the data displayed in a tree representation 20 and/or manipulation of how the hierarchical data 72 contained therein is displayed.

Window 69 is rectangular and may be resized or "scaled" by "dragging" a side border (to scale in one dimension) or corner (to scale in two dimensions) of the window to a new location. As is also shown in FIG. 5, window 69 may optionally include a horizontal scroll bar 65 and/or a vertical scroll bar 67. As illustrated in FIG. 5, various controls 120, 122, 124 relating to window 69 such as controls for closing 120, or resizing 124 window 69 may also be included within window 69, either adjacent the tree viewer control panel 68 (such as along the rightmost portion of the shaded area as shown in FIG. 5) or in the tree view display area. Alternatively, controls 120, 122, 124 may be provided in a separate area of window 69, such as a second toolbar or control area which, for example, could be located at the top of the window above tree viewer control panel 68. In a preferred embodiment, controls 120, 122, 124 comprise a button 120 for closing window 69, a button 124 for resizing window 69, and a button 122 for "minimizing" window 69.

As discussed above, each of the user selectable indicia 84, 86, 88, 90 may be associated with a function 74, 76, 78, 80. These functions may, for example, modify how the hierarchical data 72 is displayed within the tree view display 64 or directly modify the hierarchical data. Additional functions (and associated user selectable indicia 84, 86, 88, 90) may also be provided for moving a cursor or data selector 82 within the tree view display 64 or for changing the appearance of the symbols or graphic images associated with the tree representation displayed by tree view display 64.

A wide variety of different functions 74, 76, 78, 80 may be implemented. For instance, a number of different functions could be implemented which facilitate a user's efforts to scroll through or "view" the hierarchical data 72. Such functions may be particularly useful in situations where the hierarchical data set 72 is long or complex, and/or in cases where window 69 is necessarily small so that only a limited portion of the hierarchical data 72 may be viewed at any one time. Examples of such functions include functions which scroll up or down the tree representation from a selected branch to the next branch at the same level. Similarly, functions may be provided which scroll directly to the closest branch at the root level (or any other level of the tree).

Functions 74, 76, 78, 80 may also be implemented which modify how the hierarchical data 72 is displayed in the tree view display 64. For instance, functions may be provided which expand the tree view display 64 to display additional levels of the tree representation (or parts thereof). Such "expand" functions might include, for example, expanding the tree representation to display all branches on all levels, expanding the tree representation to display all branches one level below the currently selected branch, expanding the tree representation to display all branches below the currently selected branch, and/or expanding all branches of the tree representation that are at the same level as the currently selected branch to display all branches one level down. Similarly, functions may also be provided which collapse portions of the tree representation by hiding certain branches and/or levels of the tree. Such "collapse" functions might include, for example, collapsing the tree representation to only display branches at the root level, collapsing the tree representation to hide all branches below the currently selected branch, and/or collapsing the tree representation to hide all branches below the currently selected branch and all branches below the branches at the same level as the currently selected branch.

Additionally, functions 74, 76, 78, 80 could be provided for sorting the data which is displayed in the tree view display 64. Such "sort" functions would, for example, sort the data based on date, name, size, type, etc. Moreover, sort functions could be provided that sorted the entire tree as well as sort functions which only operated on specified branches or levels. Filtering functions could also be provided which would display tree items by user defined variables, such as type, date of creation, or key words specified by a user.

Functions 74, 76, 78, 80 may also be implemented which modify the hierarchical data that is displayed in the tree view display 64. For instance, a function may be provided which deletes the data selected by the selection means 82. Similarly, a function may be provided which allows a user to insert data adjacent the currently selected branch in the tree view display 64. Other functions could be provided for modifying how the data is displayed in the tree view display 64, such as functions which change the color, font, or size of the data in some or all the branches of the tree representation.

Functions 74, 76, 78, 80 may also be provided which modify any symbols and/or graphical images provided as part of the tree view display 64. A variety of different symbols and/or graphical indicia or images may be provided, such as vertical lines 92, 94, 96, 98 which connect branches in the same level of the tree, making it easier for a user to quickly determine the relationship between various branches of the tree, graphical indicia (such as the folders in FIG. 3) which provide the user information regarding the contents of certain data contained in the tree representation, and/or graphical images which provide a user access to functions which operate on the currently selected branch of the tree. By way of example, functions could be provided which change tree-wide configurable settings, such as whether or not lines 92, 94, 96, 98 (see FIG. 5) are provided which demarcate the various levels included in tree view display 64. Other functions could be provided which allow the user to select the background to the tree view display 64 portion of window 69 or which change the appearance or the location of the control panel 68. Other functions could allow a user to change the indicators (if any) used to identify individual branches in the tree, and/or to provide means such as graphical images 100, 101, 102, 103, 104, 105, 106, 107, 108, 109 in FIG. 5 for collapsing and/or expanding branches of the tree depicted in tree view display 64. A function may also be provided for allowing the user to select the form of the expand/collapse graphical images 100, 101, 102, 103, 104, 105, 106, 107, 108, 109. For example, a function button could allow the use to toggle between the standard +/− graphical expand/collapse images and the ▽/▷ graphical expand/collapse images used in other applications such as Lotus Notes.

Figure 6A:
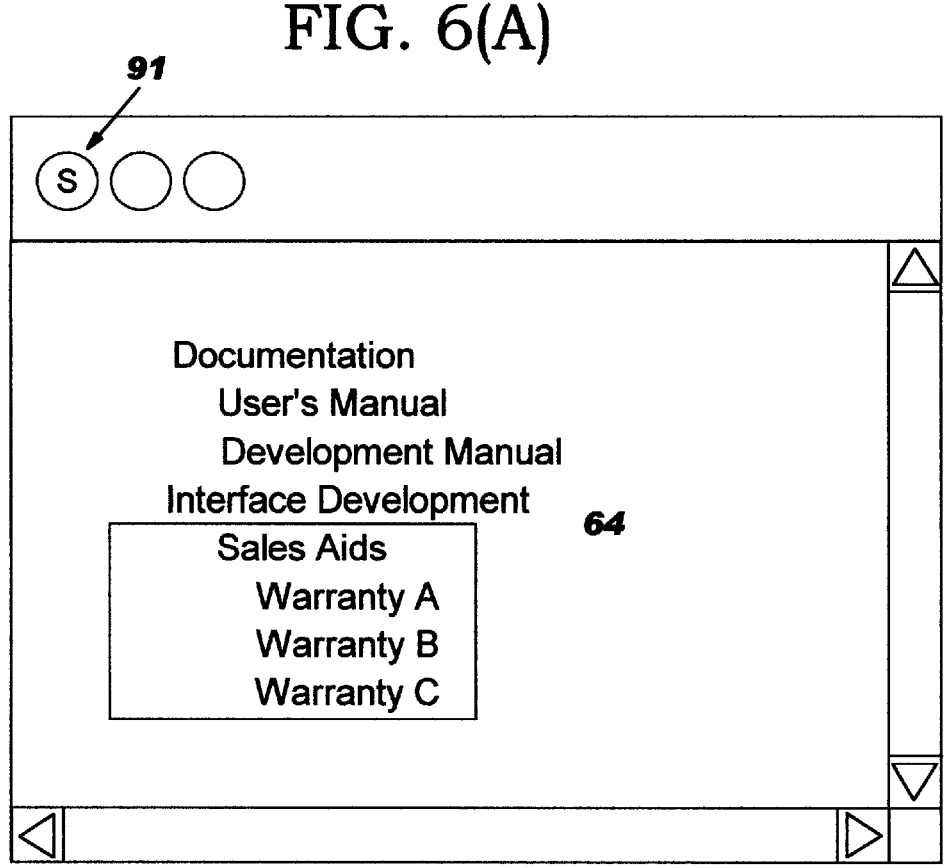
FIGS. 6(a) and 6(b) illustrate operation of the subsetting function of the present invention.
Figure 6B:
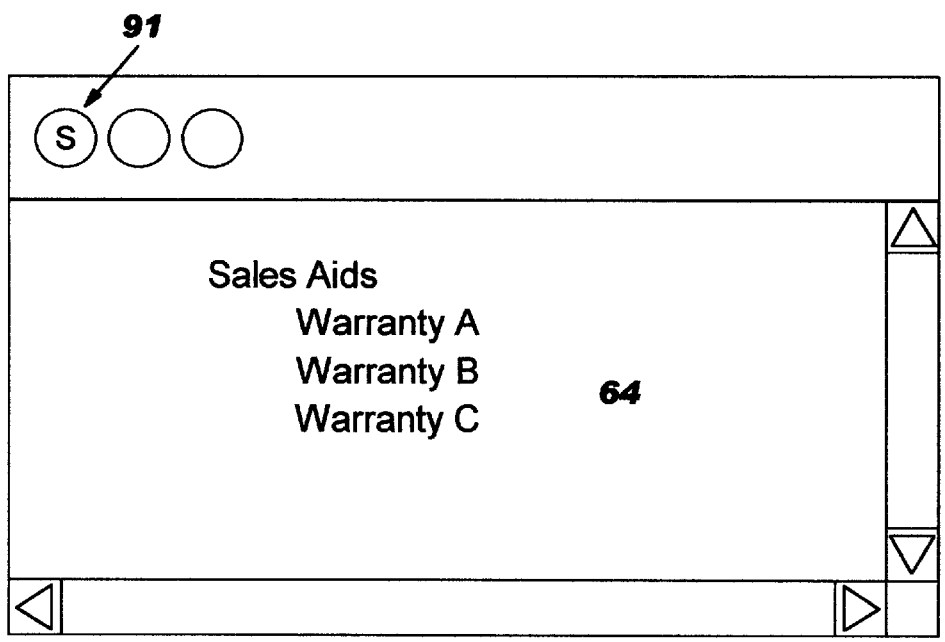

Pursuant to the teachings of the present invention, a new function which "subsets" the tree view display 64 may be provided. As illustrated in FIGS. 6(*a*) and 6(*b*), such "subsetting" of the tree effectively creates a new root at the selected subset point. Such subsetting of the tree view display 64 can simplify a user's navigation and viewing of the hierarchical data, as it may be used to effectively collapse portions of the tree which are not currently of interest to the user which may otherwise not be collapsible via traditional "collapse" functions.

As shown in FIGS. 6(*a*) and 6(*b*), the subset function may be initiated by selecting a branch of the tree depicted in the tree view display 64 and selecting the appropriate user selectable indicia (in this case button 91). When selected, the tree view display hides all the data in the tree at levels lower than the currently selected branch and at all other branches of the tree at the same level as the currently selected branch. Other implementation of the subset function may also be envisioned, such as an implementation where the user selects (via data selector 82) the branches of the tree which are to remain after subsetting.

In the embodiment of FIG. 5, the user selectable indicia are implemented as buttons 84, 86, 88, 90. In this embodiment, button 84 is associated with a function for expanding all the levels of the tree depicted in tree view display 64, while button 86 collapses all the levels of the tree. Button 88 scrolls down the tree from a currently selected branch to the next branch which is at the same level as the currently selected branch, while button 90 similarly scrolls up the tree from the currently selected branch to the next branch at the same level. It will be understood that numerous other control functions may be provided on control panel 68, such as the functions described above and/or output functions (such as a print button).

As will be understood by those of skill in the art, function "buttons" such as the buttons depicted in FIG. 5 have button behavior which is generally associated with them which separates them from other graphical images which may be associated with various functions. For example, when selected by a user the appearance of the button icon changes so that the button appears depressed, thereby indicating to a user that the function is currently selected. Additionally, function buttons generally automatically become "disabled" when their selection is no longer appropriate (e.g., the expand button would become disabled when the tree representation is fully expanded). The buttons may also be designed so that a "fly-over message" (a short message which explains to the user the function associated with the particular button) appears adjacent the button on the display device 13 when the selection means are maneuvered onto the button. Thus, as used herein the term "button" refers to graphical objects which display typical button behavior as opposed to graphical images (such as the +/− expand/collapse images) which do not display typical button behavior.

While prior art tree representations have provided users access to menus and/or buttons providing limited control over the tree representation, both the functions provided and their relationship to the tree representation were inadequate. For one thing, as data hierarchies have become increasingly complex, the control options provided by prior art tree representations are inadequate. Moreover, these functions have generally not been provided within a single window as a single entity which reinforces the relationship between the tree and the tree controller. Furthermore, it is becoming increasingly common that tree representations are used to browse a hierarchy independent of the underlying data. Such browsing is greatly facilitated by providing the browse control functions directly adjacent the data which is to be browsed making the browsing easier and more intuitive than prior art tree representations. Thus, the graphical user interfaces of the present invention are more functional, more intuitive and easier to use than prior tree representation graphical user interfaces.

One particular application in which the user interfaces of the present invention may be particularly useful is depicted in FIG. 7. As shown in FIG. 7, the application window 138 which is depicted on the desktop display includes two user interfaces 140, 150 according to the present invention. As illustrated in FIG. 7, the inclusion of a control panel 144, 154 within the window associated with each user interface 140, 150 avoids any confusion regarding which tree view display 142, 152 is controlled by each of the control panels 144, 154. In contrast, the prior art control panel depicted in FIG. 1 is not clearly associated with either of the underlying representations, and hence would not be well-suited for an application such as the application displayed in FIG. 7 which has two tree representations opened simultaneously.

In addition to providing an interface which is more intuitive and less confusing than prior art tree view user interfaces, via the teachings of the present invention, composite graphical user interface are provided which combine a tree viewer object 62 and a tree view controller 66 in a single object which includes a common interface for interfacing with an application program 12 in which the object is to be used. Accordingly, neither custom coding nor external controls are required for the control of tree viewer object 62, greatly simplifying an application developer's integration of the user interface object 60 into a computer application 12. This composite object is re-useable in the sense that it is designed to easily interface with any of a wide variety of application programs, providing an off-the-shelf object which displays data in tree representation and further includes a wide variety of functions for controlling the tree representation and the data therein. This "composite object" implementation is also advantageous because once integrated into an application program it is easier to manage and support as compared to multiple objects and/or custom coding.

Moreover, in a preferred embodiment of the present invention, the user interface objects 60 of the present invention are programmable. Specifically, user interface object 60 may be created with a wide variety of predefined, built in functions 74, 76, 78, 80, which, in a preferred embodiment, will include a large number of the functions described herein and other tree view control functions known to those of skill in the art. User interface object 60 can then be customized for use in a particular application 12 in that the predefined functions most relevant to that application 12 can be provided in the control panel 68 where the user gains access to them. This "programming" of user interface object 60 to select from amongst predefined functions may be performed either by an application developer, or by the user, thus providing a simple and convenient method for customizing the user interface objects 60 of the present invention for a particular application 12. These features facilitate use of the user interface objects 60 in a wide variety of applications as a programmable user interface object.

As discussed above, the tree view display 64 and the tree view control panel 68 associated with object 60 are implemented within a single window 69 so as to appear as an integrated display. Moreover, in a preferred embodiment the buttons or other user selectable indicia 84, 86, 88, 90 provided in control panel 68 (and their corresponding functions 74, 76, 78, 80) are exclusively directed to control of the tree viewer object 62 (or the hierarchical data 72 depicted therein). This implementation further reinforces to a user the relationship between the tree view control panel 68 and the tree view display 64, and avoids confusion which may arise were additional functions provided which related to other windows in the desktop display or application wide functions.

The present invention will now be described with respect to FIG. 8, which is a flowchart illustrating a method for displaying hierarchical data in a display window. It will be understood that each block in the flowchart, and combinations of blocks in the flowchart, can be implemented by computer program instructions. These program instructions may be provided to a processor such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

Figure 8:
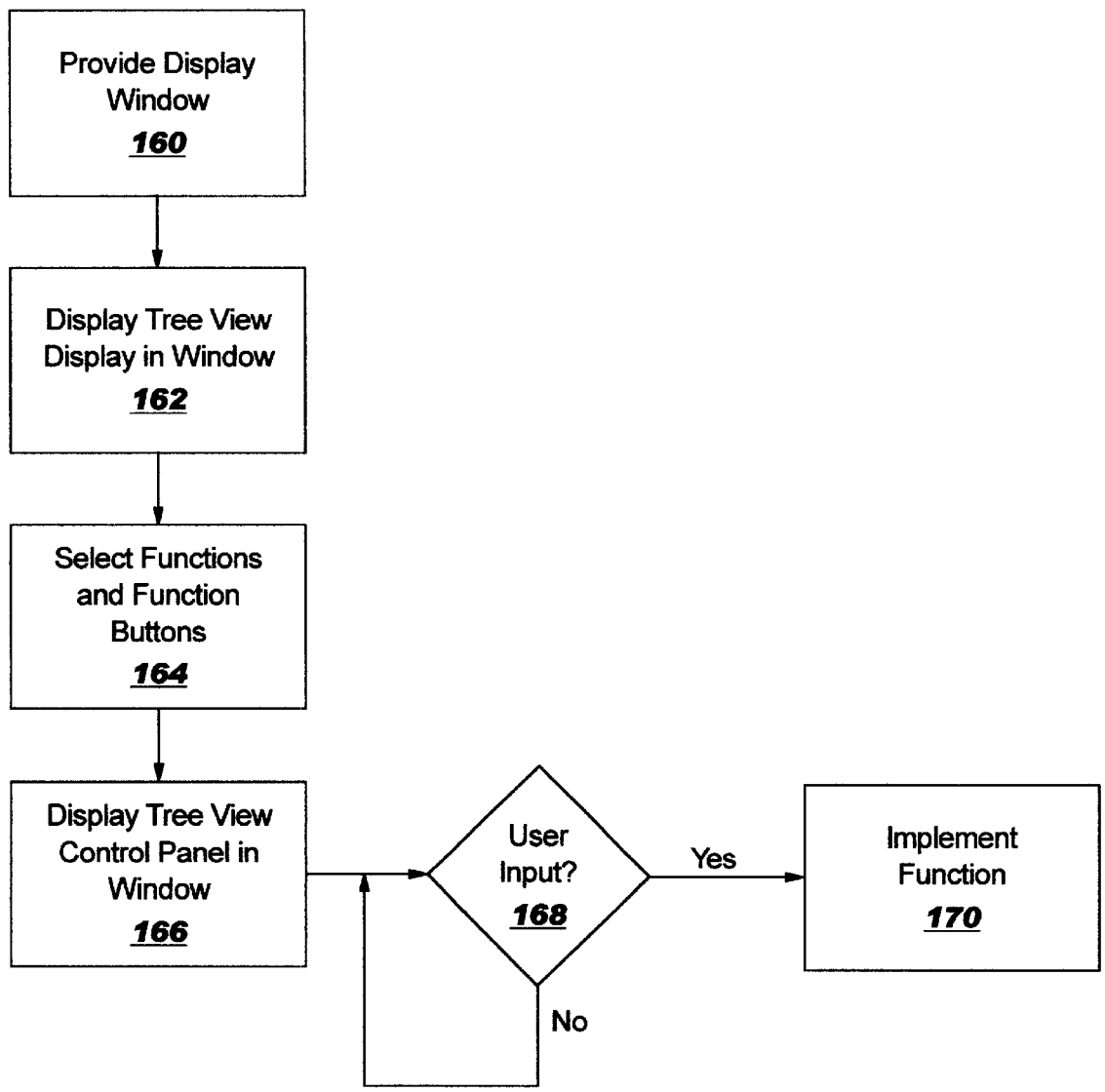
FIG. 8 is a flowchart of one embodiment of the present invention.

As illustrated in FIG. 8, pursuant to the teachings of the present invention, methods are provided for displaying and manipulating a set of hierarchical data on a computer display device. As shown in the figure, a display window 69 is provided which is provided on the user's display device 13 (block 160), and a tree view display 64 is then displayed within this display window 69 (block 162). The user or the application developer may then select, from a predefined set of user selectable indicia, specific user selectable indicia which will be displayed on the tree view control panel 68 (block 164). Once the user selectable indicia have been selected, the tree view control panel is displayed within the display window adjacent the tree view display such that the tree view display and the tree view control panel appear to the user as a single integrated graphical user interface (block 166). Then, upon receiving input from a user, in the form of the selection of one of the user selectable indicia on the control panel, (block 168), the function which corresponds to the user selectable indicia which was selected by the user is activated so as to modify the tree view display (block 170).

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A composite graphical user interface for representing and manipulating a set of hierarchical data on a computer display device, the composite graphical user interface comprising:

a display window on the computer display device;

a tree view display disposed within the display window, wherein the tree view display depicts the set of hierarchical data in a tree representation having a root level and at least one lower level, and wherein each level of the tree representation includes at least one branch containing a portion of the set of hierarchical data; and a tree view control panel disposed within the display window adjacent the tree view display, wherein the tree view control panel comprises a plurality of user selectable indicia which select a corresponding one of a plurality of functions which modify the tree view display, and wherein the plurality of user selectable indicia are selectable from a predefined set of user selectable indicia, and wherein the tree view display and the tree view control panel appear to the user as a single integrated graphical user interface.

2. The composite graphical user interface of claim 1, wherein said plurality of functions are exclusively associated with the tree view display.

3. The composite graphical user interface of claim 2, wherein the tree view control panel comprises a toolbar and wherein the user selectable indicia comprise a plurality of function buttons.

4. The composite graphical user interface of claim 3, wherein one of the plurality of functions sub-sets the tree representation at a branch below the root level.

5. The composite graphical user interface of claim 3, further comprising selection means operably associated with the tree view display for selecting at least one branch of the tree representation and wherein a first of the plurality of functions corresponding to the function buttons modifies the hierarchical data displayed in the tree representation, and wherein a second of the plurality of functions corresponding to the function buttons modifies how the hierarchical data in the tree representation is displayed.

6. The composite graphical user interface of claim 5, wherein said first of the plurality of functions is selected from the set of:

deleting the portion of the hierarchical data selected by the selection means;

inserting hierarchical data adjacent the branch selected by the selection means;

changing the color of at least one branch;

changing the font of at least one branch;

changing the font size of at least one branch.

7. The composite graphical user interface of claim 5, wherein said second of the plurality of functions is selected from the set of:

sorting the hierarchical data displayed in the tree representation based on a selected criteria;

filtering the hierarchical data displayed in the tree representation based on a selected criteria;

expanding the tree representation to display all branches on all levels;

expanding the tree representation to display all branches one level below the currently selected branch;

expanding the tree representation to display all branches below the currently selected branch;

expanding all branches of the tree representation that are at the same level as the currently selected branch to display all branches one level down;

collapsing the tree representation to only display branches at the root level;

collapsing the tree representation to hide all branches below the currently selected branch;

collapsing the tree representation to hide all branches below the currently selected branch and all branches below the branches at the same level as the currently selected branch sub-setting the tree representation at the level of the currently selected branch.

8. The composite graphical user interface of claim 5, wherein a third of the plurality of functions corresponding to the function buttons moves the selection means from a currently selected branch to a different branch in the tree representation.

9. The composite graphical user interface of claim 8, wherein said third of the plurality of functions is selected from the set of:

scrolls down the tree representation to the next branch of the same level;

scrolls up the tree representation to the next branch of the same level.

10. The composite graphical user interface of claim 8, wherein the tree representation further comprises graphical indicia which reflect information regarding the tree representation, and wherein a fourth of the plurality of functions corresponding to the function buttons modifies the graphical indicia.

11. The composite graphical user interface of claim 3, wherein the computer display window further comprises a horizontal scroll bar and a vertical scroll bar, and wherein the computer display window is horizontally and vertically extendable and retractable.

12. A programmable user interface object for representing and manipulating a set of hierarchical data associated with a computer application, the programmable user interface object comprising:

a tree viewer object for depicting the set of hierarchical data within a display window in a tree view display having a root level and at least one lower level, wherein each level of the tree view display includes at least one branch containing a portion of the set of hierarchical data;

a tree view control object integrated with the tree viewer object such that the tree viewer object and the tree view control object comprise a composite user interface object, wherein the tree view control object comprises a plurality of functions for modifying the tree view display and a plurality of user selectable indicia which are displayed in a control panel within the display window and which select a corresponding one of the plurality of functions, and wherein the control panel is displayed adjacent the tree view display within the display window so as to appear to the user as an integrated tree view display and associated control panel; and a common interface mechanism for associating the tree viewer object and the tree view control object with the computer application.

13. The user interface object of claim 12, wherein the plurality of functions are exclusively associated with the tree view display, and wherein the plurality of user selectable control indicia are selectable from a predefined set of user selectable indicia.

14. The user interface object of claim 13, wherein the tree view control panel comprises a toolbar and wherein the user selectable indicia comprise a plurality of function buttons.

15. The user interface object of claim 14, further comprising selection means operably associated with the tree viewer object for selecting at least one branch of the tree view display and wherein a first of the plurality of functions corresponding to the function buttons modifies the hierarchical data displayed in the tree view display, a second of the plurality of functions corresponding to the function buttons modifies how the hierarchical data in the tree view display is displayed, and a third of the plurality of functions corresponding to the function buttons moves the selection means from a currently selected branch to a different branch in the tree view display.

16. A method for displaying and manipulating a set of hierarchical data on a computer display device, the method comprising the steps of:

providing a display window on the computer display device;

displaying a tree view display within the display window, wherein the tree view display depicts the set of hierarchical data in a tree representation having a root level and at least one lower level, and wherein each level of the tree representation includes at least one branch containing a portion of the set of hierarchical data;

selecting, from a predefined set of user selectable indicia, user selectable indicia for display on a tree view control panel;

displaying the tree view control panel within the display window adjacent the tree view display such that the tree view display and the tree view control panel appear to the user as a single integrated graphical user interface, wherein the tree view control panel includes the selected user selectable indicia;

accepting user input for selection of one of the user selectable indicia which are displayed on the tree view control panel; and activating the one of a plurality of functions corresponding to the user selectable indicia selected by the user so as to modify the tree view display.

17. The method of claim 16, wherein said plurality of functions are exclusively associated with the tree view display.

18. The method of claim 17, wherein the tree view control panel comprises a toolbar and wherein the user selectable indicia comprise a plurality of function buttons.

19. A computer program product for displaying and manipulating a set of hierarchical data on a computer display device, comprising:

a computer-readable storage medium having computer-readable program code means embodied in said medium, said computer-readable program code means comprising:

computer-readable program code means for providing a display window on the computer display device;

computer-readable program code means for displaying a tree view display within the display window, wherein the tree view display depicts the set of hierarchical data in a tree representation having a root level and at least one lower level, and wherein each level of the tree representation includes at least one branch containing a portion of the set of hierarchical data;

computer-readable program code means for selecting, from a predefined set of user selectable indicia, user selectable indicia for display on a tree view control panel;

computer-readable program code means for displaying the tree view control panel within the display window adjacent the tree view display such that the tree view display and the tree view control panel appear to the user as a single integrated graphical user interface, wherein the tree view control panel includes the selected user selectable indicia;

computer-readable program code means for accepting user input for selection of one of the user selectable indicia which are displayed on the tree view control panel; and computer-readable program code means for activating the one of a plurality of functions corresponding to the user selectable indicia selected by the user so as to modify the tree view display.

20. The computer program product according to claim 19, wherein said plurality of functions are exclusively associated with the tree view display.

21. The computer program product according to claim 20, wherein the tree view control panel comprises a toolbar and wherein the user selectable indicia comprise a plurality of function buttons.

* * * * *